(12) United States Patent
Ouchi

(10) Patent No.: US 8,035,872 B2
(45) Date of Patent: Oct. 11, 2011

(54) IMAGE COMBINER AND IMAGE DISPLAY DEVICE

(75) Inventor: Yumiko Ouchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 646 days.

(21) Appl. No.: 11/630,621

(22) PCT Filed: Jun. 20, 2005

(86) PCT No.: PCT/JP2005/011277
§ 371 (c)(1),
(2), (4) Date: Dec. 22, 2006

(87) PCT Pub. No.: WO2006/001254
PCT Pub. Date: Jan. 5, 2006

(65) Prior Publication Data
US 2007/0285752 A1   Dec. 13, 2007

(51) Int. Cl.
*G03H 1/00* (2006.01)
*G02B 5/30* (2006.01)
*G02B 5/32* (2006.01)

(52) U.S. Cl. ....... 359/13; 359/15; 359/485.01; 359/630; 359/633; 345/7

(58) Field of Classification Search .................. 359/487, 359/495, 629, 631, 633, 13, 15, 630; 345/7, 345/8
See application file for complete search history.

(56) References Cited

U.S. PATENT DOCUMENTS

| | | | |
|---|---|---|---|
| 5,539,578 A | 7/1996 | Togino et al. | |
| 5,886,822 A | 3/1999 | Spitzer | |
| 5,943,171 A * | 8/1999 | Budd et al. | 359/631 |
| 6,023,372 A * | 2/2000 | Spitzer et al. | 359/630 |
| 6,091,546 A * | 7/2000 | Spitzer | 359/618 |
| 6,204,974 B1 * | 3/2001 | Spitzer | 359/630 |
| 6,353,503 B1 * | 3/2002 | Spitzer et al. | 359/630 |
| 6,618,099 B1 * | 9/2003 | Spitzer | 349/13 |
| 6,671,100 B1 * | 12/2003 | McRuer | 359/630 |
| 6,724,354 B1 * | 4/2004 | Spitzer et al. | 345/32 |
| 7,068,404 B2 * | 6/2006 | Ouchi et al. | 359/15 |
| 7,085,027 B2 * | 8/2006 | Ouchi et al. | 359/16 |
| 7,233,422 B2 * | 6/2007 | Endo et al. | 359/15 |
| 7,242,527 B2 * | 7/2007 | Spitzer et al. | 359/630 |
| 2002/0036751 A1 | 3/2002 | Tanijiri et al. | |

FOREIGN PATENT DOCUMENTS

| | | |
|---|---|---|
| JP | A 06-258594 | 9/1994 |
| JP | A 2000-511306 | 8/2000 |
| JP | A 2001-004953 | 1/2001 |
| JP | A 2002-156600 | 5/2002 |
| JP | A 2002-287078 | 10/2002 |

* cited by examiner

*Primary Examiner* — Ricky Shafer
(74) *Attorney, Agent, or Firm* — Oliff & Berridge, PLC

(57) ABSTRACT

The present invention aims to provide an image combiner and an image display device which can easily have a wide field of view and reduce a thickness of a substrate while reducing loss of light intensity by means of a PBS. An image combiner includes a substrate transparent to visible light; and a polarization beam splitter installed in the substrate to reflect a light flux introduced into the substrate from an image-display element and to make the light flux incident on an exit pupil outside the substrate. An exit angle $\theta_0$ at which a principal ray of the light flux emitted from a center of a display surface of the image-display element is emitted from a surface of the substrate toward a center of the exit pupil satisfies a condition of $3° \leq \theta_0$.

14 Claims, 17 Drawing Sheets

| surface number(symbols) | radius of curvature | medium nd νd |
|---|---|---|
| 1 (P) | INFINITY | |
| 2 (5a:R2) | INFINITY | 1.583  29.9 |
| 3 (6) | INFINITY | 1.583  29.9 |
| 4 (8) | 93.25292 | 1.583  29.9 |
| 5 (5b:R1) | INFINITY | 1.583  29.9 |
| 6 (5c) | INFINITY | |
| 7 (11c) | INFINITY | 1.5955  39.2 |
| 8 (11b) | -4.70559 | 1.5425  62.9 |
| 9 (11a) | 12.1715 | |
| 10 (2) | INFINITY | |

Fig. 19

| surface | X coordinate | Y coordinate | Z coordinate | angle around X axis |
|---|---|---|---|---|
| 1 (p) | 0 | 0 | 0 | 0 |
| 2 (5a:R2) | 0 | 0 | 13 | 0 |
| 3 (6) | 0 | 0 | 14 | 39 |
| 4 (8) | 0 | -3.38613 | 14.53932 | 80.841 |
| 5 (5b:R1) | 0 | 0 | 16.6 | 0 |
| 6 (5c) | 0 | 22.90849 | 14.47439 | -87.1364 |
| 7 (11c) | 0 | 23.8958 | 14.1956 | -77.1401 |
| 8 (11b) | 0 | 25.35817 | 13.86174 | -77.1401 |
| 9 (11a) | 0 | 28.28293 | 13.19404 | -77.1401 |
| 10 (2) | 0 | 34.44472 | 11.78734 | -77.1401 |

Fig. 20

| surface number (symbols) | radius of curvature | medium nd νd |
|---|---|---|
| 1 (p) | INFINITY | |
| 2 (5a:R4) | INFINITY | 1.583 29.9 |
| 3 (6) | INFINITY | 1.583 29.9 |
| 4 (8) | 108.66279 | 1.583 29.9 |
| 5 (5b:R3) | INFINITY | 1.583 29.9 |
| 6 (5a:R2) | INFINITY | 1.583 29.9 |
| 7 (5b:R1) | INFINITY | 1.583 29.9 |
| 8 (21b) | -10 | 1.5425 62.9 |
| 9 (21a) | 20 | |
| 10 (2) | INFINITY | |

Fig. 21

| surface | X coordinate | Y coordinate | Z coordinate | angle around X axis |
|---|---|---|---|---|
| 1(p) | 0 | 0 | 0 | 0 |
| 2(5a:R4) | 0 | 0 | 13 | 0 |
| 3(6) | 0 | 0 | 14.245 | 35 |
| 4(8) | 0 | -3.4798 | 14.44949 | 73.1554 |
| 5(5b:R3) | 0 | 0 | 16.6 | 0 |
| 6(5a:R2) | 0 | 0 | 13 | 0 |
| 7(5b:R1) | 0 | 0 | 16.6 | 0 |
| 8(21b) | 0 | 38.9625 | 13.1 | -73.15 |
| 9(21a) | 0 | 41.8337 | 12.2304 | -73.15 |
| 10(2) | 0 | 44.7049 | 11.3608 | -73.15 |

IMAGE COMBINER AND IMAGE DISPLAY DEVICE

CROSS-REFERENCE TO RELATED APPLICATION

This application is a U.S. nationalization of International Application PCT/JP2005/011277, filed Jun. 20, 2005, designating the U.S., and claims the benefit of priority from Japanese Patent Application No. 2004-191840, filed on Jun. 29, 2004, the entire contents of which are incorporated herein by reference.

TECHNICAL ART

The present invention relates to an image combiner which superimposing an image based on a light from the front of a user (outside world) and an image by a light flux from a predetermined image display element (display image) for display to the user, and it relates to an image display device including the same.

TECHNOLOGICAL BACKGROUND

In recent years, a head-mounted image display device of a so-called see-through type has come into practical use. It allows a user to view an image of an image-display element while viewing the outside (disclosed in Patent Document 1).

An image display device described in Patent Document 1 uses a polarization beam splitter (hereinafter, referred to as a "PBS") as a combiner which reflects the polarizing light flux from an image-display element, so that it reduces a loss of light intensity. To obtain this advantageous effect, the posture of the PBS of the image display device is inclined relative at 45° to an optical path. Accordingly, the posture of the PBS is also inclined at 45° relative to a surface of a substrate.

Patent Document 1: U.S. Pat. No. 5,886,822

DISCLOSURE OF THE INVENTION

Problems to be Solved by the Invention

However, it is difficult for the image display device with such a layout to keep wide field of view and reduce thickness of the substrate at the same time. This is because, for a wide field of view, the PBS has to have a large area, which causes an increase in thickness of the substrate. For example, when FOV (field of view) of a diagonal image display device is 15.6°, a thickness d of a substrate becomes 5.5 mm.

In view of solving the above problems, it is an object of the present invention to provide an image combiner and an image display device which can easily have a wide field of view and reduce thickness of a substrate at the same time while reducing light intensity loss by means of a PBS.

Means to Solve the Problems

To devise the present invention, the inventor studied the following two points.

(Loss of Light Intensity)

A PBS, that is, a polarization/separation film made of an optical thin film has a function of increasing a difference between reflectances of a p-polarized component and an s-polarized component of incident light on a reflection surface of glass. In particular, since the reflectance for the p-polarized component is zero when an incident angle of the light matches with a Brewster angle, the optical thin film should be designed so as to enhance reflectance for the s-polarized component at this time, and increase an extinction ratio. That is, to suppress loss of light intensity, an incident angle closer to the Brewster angle is more advantageous.

(Thickness of the Substrate)

To reduce the thickness of a substrate of an image combiner, an angle between the PBS and the substrate is desirably smaller than 45°, and as small as possible. Therefore, the inventor came up with the idea of inclining a line of sight of a user's eye at a certain angle relative to a normal of the substrate.

An image combiner of the present invention includes a substrate transparent to visible light; and a polarization beam splitter installed in the substrate, to reflect a light flux emitted from image forming means and passing through the substrate and to make the light flux incident on an exit pupil outside the substrate. A principal ray of the light flux emitted from a center of a display part of the image forming means is emitted from a surface of the substrate toward a center of the exit pupil at an exit angle $\theta_0$ which satisfies a condition of $3° \leq \theta_0$.

An angle $\theta_2$ at which the polarization beam splitter is set relative to the surface of the substrate may satisfy a condition of $30° < \theta_2 < 42°$. Furthermore, the angle $\theta_2$ may satisfy a condition of $35° < \theta_2 < 42°$.

Further, the substrate may include a reflection member which reflects the light flux propagating in the substrate while totally reflected at least once, to make the light flux incident on the polarization beam splitter. The reflection member may be designed to allow the angle $\theta_0$ and the angle $\theta_2$ to satisfy the respective conditions.

The reflection member may also be a concave mirror. At least one of the reflection member and the polarization beam splitter may have a reflection wavelength selectivity to select a wavelength of the light flux. Alternatively, the reflection member may be a reflective-type holographic optical element formed to have a concave surface. Further, the reflective-type holographic optical element may have no optical power.

An image display device of the present invention includes image forming means emitting a light flux; and any of the image combiners according to the present invention.

The nature, principle, and utility of the invention will become more apparent from the following detailed description when read in conjunction with the accompanying drawings in which like parts are designated by identical reference numbers, in which:

BRIEF DESCRIPTION OF THE DRAWINGS

FIG. 3(*b*) is a view to illustrate $\theta_0$, $\theta_2$, a field of view, and a degree of loss of light intensity;

FIG. 18 is a table showing shapes of respective surfaces and refractive indices of mediums in the first design example of the first embodiment;

FIG. 19 is a table showing coordinates and postures of the respective surfaces in the first design example of the first embodiment;

FIG. 20 is a table showing shapes of respective surfaces and refractive indices of mediums in the first design example of the second embodiment; and FIG. 21 is a table showing coordinates and postures of the respective surfaces in the first design example of the second embodiment.

BEST MODE FOR CARRYING OUT THE INVENTION

First Embodiment

Hereinafter, a first embodiment of the present invention will be described based on FIG. 1, FIG. 2, FIGS. 3(a), (b), FIG. 4, FIG. 5, FIG. 6, FIG. 7, FIGS. 8(a), (b), FIGS. 9(a), (b), FIG. 10, FIG. 11, FIG. 18, and FIG. 19.

This embodiment concerns an image display device of the present invention.

First, the structure of the image display device will be described.

Figure 1:
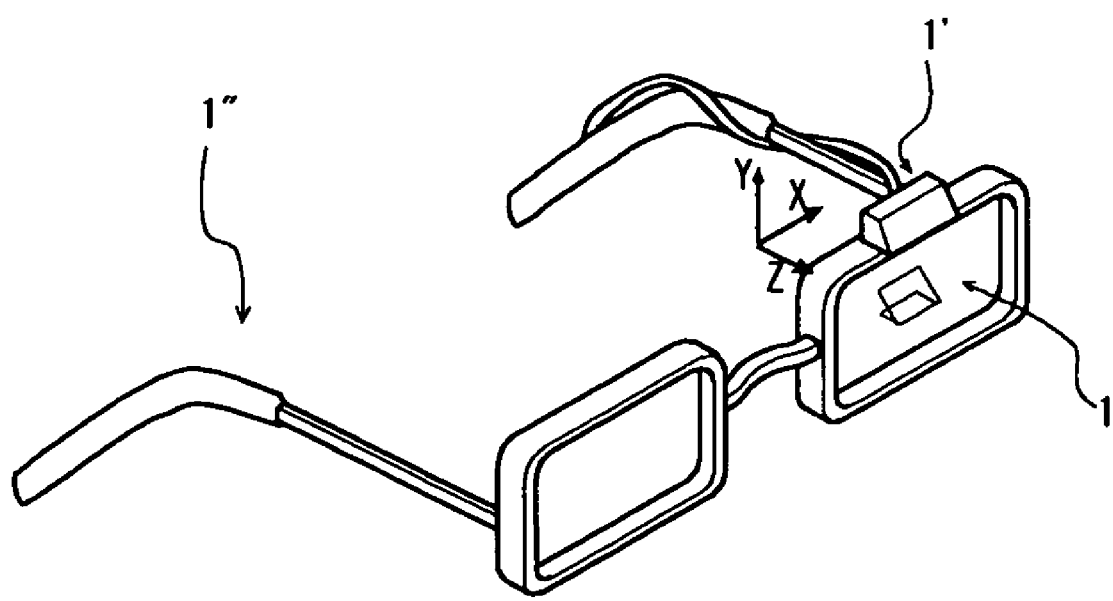
FIG. 1 is a perspective view showing an entire image display device of a first embodiment.

As shown in FIG. 1, the image display device includes a transparent substrate 1 transparent to visible light and an image-supply unit 1'. The transparent substrate 1 and the image-supply unit 1' are supported by a support member 1" and the image display device is worn by a user on the head.

For example, the support member 1" has a structure similar to a frame of eyeglasses and is composed of temples, a rim, a bridge, and so on as shown in FIG. 1.

When the image display device is put on the head of the user, the transparent substrate 1 is positioned in front of a user's eye (here, a left eye of the user). Further, the image-supply unit 1' is positioned at a place (here, in front of a user's forehead on the user's eye side) so as not to obstruct the user's view.

Figure 2:
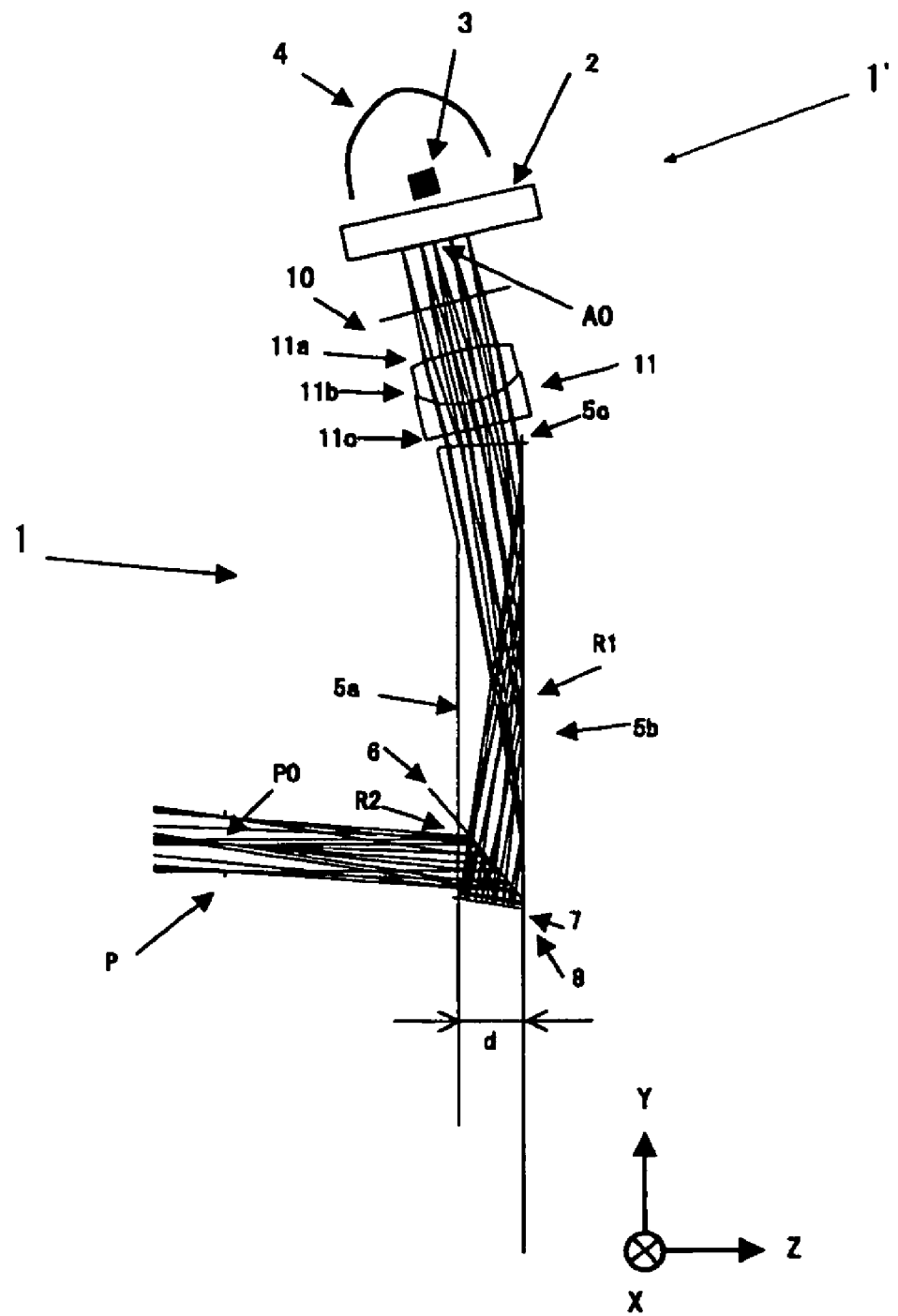
FIG. 2 is a view (cross-sectional view taken along the YZ plane) showing optical paths of the image display device of the first embodiment.
Figure 3:
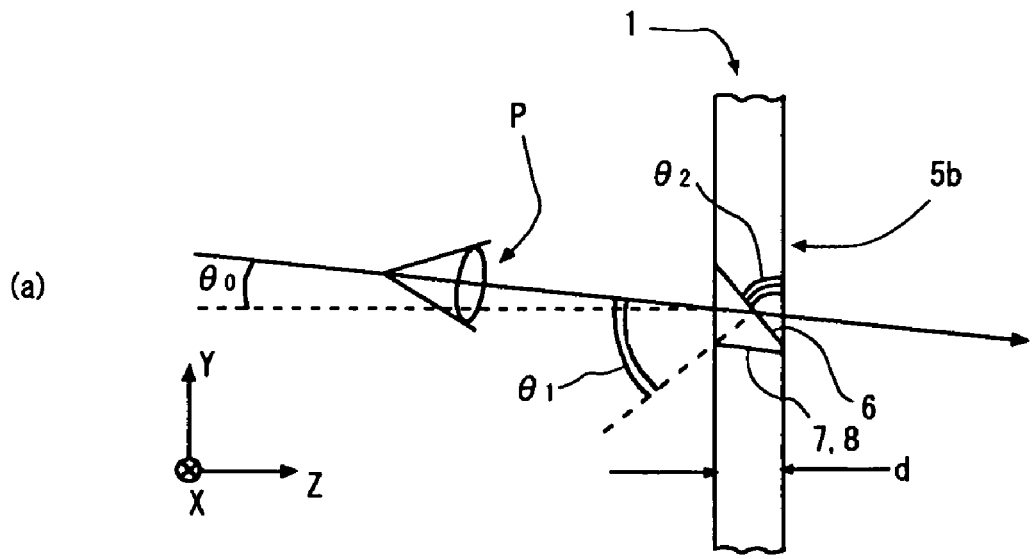
FIG. 3(*a*) is a view (cross-sectional view taken along the YZ plane) showing the relation between a line of sight of a user's eye and a transparent substrate 1.
Figure 3:
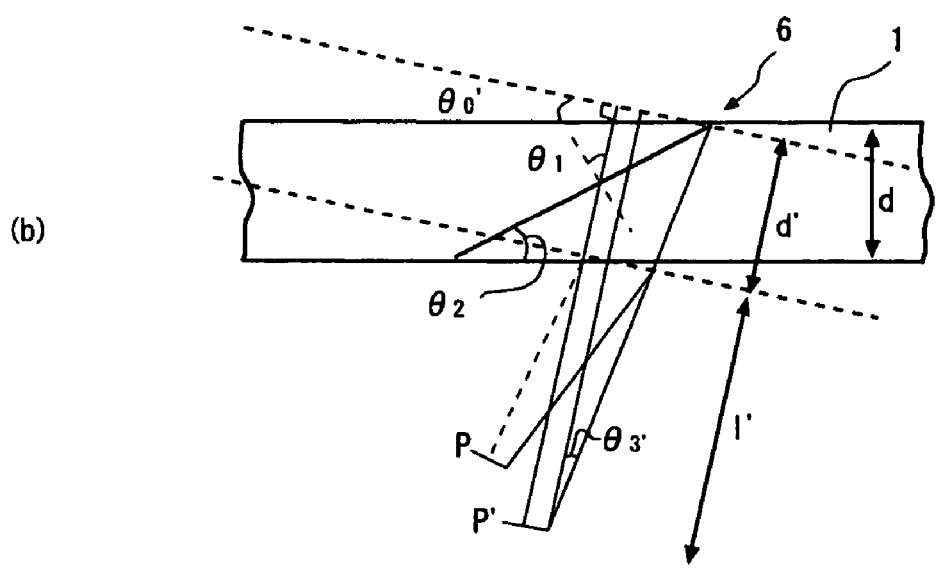

In this embodiment, the image display device is expressed by a right-handed XYZ Cartesian coordinate system in which the +Z direction is a direction of a visual axis (line of sight) when the user's eye is seeing a front far point in this state, the +X direction points a leftward side of the user, and the +Y direction points an upward side of the user (the same applies to FIG. 2 and FIG. 3). In some cases, the image display device is expressed in terms of directions when seen from the user (right, left, up, down, and the like).

As shown in FIG. 2, in the image-supply unit 1', a light source 3, an illumination system 4, a monochrome or color image-display element 2, a half wave plate 10, and a lens 11 are disposed. The lens 11 in the image-supply unit 1' and the transparent substrate 1 function as an image combiner of the image display device.

For example, a LED, a parabolic mirror, and a LCD are used as the light source 3, the illumination system 4, and the image-display element 2 of the image-supply unit 1' respectively. As the LCD, a transmissive LCD, a reflective LCD, or the like is applicable (transmissive LCD in FIG. 2). Another possible structure is to use a self-luminous type as the image display element 2 and omit the light source 3 and the illumination system 4.

An original form of the transparent substrate 1 is a plane-parallel plate made of an optical material such as glass or plastic. The transparent substrate 1 is postured so that normals of its user-side surface 5a and external-side surface 5b are parallel to the Z axis.

A PBS 6, a λ/4 plate 7, and a concave mirror 8 are provided in the transparent substrate 1.

The PBS 6 is formed near a position facing the user's eye, and is postured to be inclined from an upper near side toward a lower far side of the user.

The concave mirror 8 is formed at a position lower than the PBS 6 when seen from the user, and is postured so that its reflective surface faces the PBS 6 side. The λ/4 plate 7 is formed on the reflective surface side of the concave mirror 8.

Incidentally, a method of manufacturing the transparent substrate 1 provided with the PBS 6 is as follows, for instance. Specifically, the PBS 6 is formed on a surface of a small piece made of the same material as the material of the transparent substrate 1, the small piece is disposed in a formwork for forming the transparent substrate 1, and the material of the transparent substrate 1 in molten form is poured into the formwork to be solidified.

Next, behaviors of rays in the image display device will be described.

Light fluxes at respective fields of view emitted from points on a display surface of the image-display element 2 are changed in polarization direction to p-polarization in the half wave plate 10 to be introduced via the lens 11 into the transparent substrate 1 from a surface 5c which is an upper end portion of the transparent substrate 1 when seen from the user.

The light fluxes are incident on a region R1 of a surface 5b of the transparent substrate 1 at incident angles larger than a critical angle and, after totally reflected on the region R1, are incident on the PBS 6.

At this time, since the light fluxes have been p-polarized, they pass through the PBS 6. Then, the light fluxes are reflected on the concave mirror 8 via the λ/4 plate 7 to undergo a focusing action and are incident again on the PBS

6 via the λ/4 plate 7. Having been s-polarized, the light fluxes incident again are reflected on the PBS 6.

The light fluxes reflected on the PBS 6 are emitted from a region R2 of the surface 5a of the transparent substrate 1 to an exterior of the transparent substrate 1 to be incident on a region P near a pupil of the user's eye.

The light fluxes at the respective fields of view are incident on the region P at angles so that a virtual image of a display surface of the image-display element 2 is formed at a position with a predetermined distance (about 1 m from the region P) apart from the transparent substrate 1 toward an exterior. This region P is an exit pupil of the image display device. When the pupil of the user's eye is aligned with the exit pupil P, the user's eye can observe the virtual image of the display surface.

Note that in this specification, an optical axis of the image display device is defined as a path of a principal ray of the light flux emitted from a center A0 of the display surface. Therefore, the optical axis of the image-display element is not one straight line but a kinked line.

Next, characteristics of the light source (LED) 3 and the PBS 6 will be described.

Emission characteristics (wavelength-luminance characteristics) of the light source (LED) 3 have a peak at a specific single wavelength when the image-display element 2 is a monochrome image-display element. When the image-display element 2 is a color image-display element, the emission characteristics have peaks at a plurality of specific wavelengths (respective wavelengths of R color, G color, and B color). Therefore, the light flux has a single specific wavelength component or a plurality of discrete specific wavelength components.

Reflection characteristics (wavelength-reflectance characteristics) of the PBS 6 have a peak at the specific wavelength component of the light flux (that is, exhibits reflection wavelength selectivity to select the specific wavelength component).

Next, features and effects of this image display device will be described.

As shown in FIG. 3(a), an angle (exit angle) $\theta_0$ of an optical axis from the transparent substrate 1 to the exit pupil P relative to the normal of the surface 5a of the transparent substrate 1 satisfies the following conditions (1).

$$3° \leq \theta_0 \quad (1)$$

According to this condition (1), in a case where the posture of the transparent substrate 1 is set as previously described (in a case where the normals of the surfaces 5a, 5b are parallel to the Z axis), a direction of a line of sight in which the user's eye observes the virtual image of the display surface deviates from the Z direction. In this embodiment, as shown in FIG. 3(a), the angle $\theta_0$ is set so that the direction of the line of sight when the user observes the virtual image of the display surface is set not to "an upward direction" but "a downward direction" for the user.

If this condition (1) is satisfied, the following conditions (2), (3) can be surely satisfied.

The condition (2) is as follows, $$30° < \theta_2 < 42° \quad (2)$$

where $\theta_2$ is an angle at which the PBS 6 is set relative to the surface 5a (or the surface 5b).

Satisfying this condition (2) makes it possible to reduce loss of light intensity and project an image with a wider field of view than in a conventional art onto the pupil even with the same thickness of the transparent substrate 1.

The reason will be explained by using the drawing.

FIG. 3(b) is a view to illustrate $\theta_0$, $\theta_2$, the field of view, and the degree of loss of light intensity. The position of the pupil of the user is a point P in the air, but for simplicity, it is assumed that the position of the pupil is in a medium equal in refractive index to the transparent substrate 1. In this case, the position of the pupil is defined as P', a distance between the transparent substrate 1 and the pupil is defined as 1', an angle between the normal of the transparent substrate 1 and the line of sight is defined as $\theta_0$', and a thickness of the transparent substrate 1 in terms of the transparent substrate perpendicular to the line of sight is defined as d'. At this time, the thickness d' is given by $$d' = d/\cos[\arctan\{1/(2\times\tan\theta_2)\}] \times \sin[90° + \theta_0' - \arctan\{1/(2\times\tan\theta_2)\}].$$

A half field of view $\theta_3$' in the medium is given by $$\theta_3' = \arctan\{1/233\,(d'/\tan\theta_1)/(d'+1')\},$$

where $\theta_1$ is an angle of the optical axes on the incident side and the reflection side of the PBS 6 relative to the normal of the PBS 6.

Here, the above conditions will be calculated on the following assumption: the transparent substrate 1 has thickness and weight on the same level as those of an eyeglass substrate for thickness and weight reduction; d=about 3.5 mm; the distance 1 in the air between the transparent substrate 1 and the pupil=13 mm; a refractive index of the medium is 1.6; and 1'=20.8 mm.

A lower limit value is determined according to a limit of performance of the PBS 6. When $\theta_0$ takes the lower limit 3° of the condition (1) and $\theta_2$ takes the lower limit 30° of the condition (2), $\theta_1$=31.9°, and the half field of view in the medium is obtained as $\theta_3$'=6.8°.

The performance of the PBS 6 when $\theta_1$=31.9° is as follows: Tp>90% where Tp is transmittance for the p-polarized component; and Ts<about 60% where Ts is transmittance for the s-polarized component, and therefore, the loss of light intensity can be made small.

More preferably, the lower limit of $\theta_2$ is 35°. In this case, $\theta_1$=36.9°, and accordingly, the obtained half field of view in the medium is $\theta_3$'=5.6°.

The performance of the PBS 6 when $\theta_1$=36.9° is as follows: Tp>90% where Tp is transmittance for the p-polarized component; and Ts<about 50% where Ts is transmittance for the s-polarized component, and therefore, the loss of light intensity can be made still smaller.

An upper limit value is determined according to a value of the field of view. When $\theta_0$ is 5° and $\theta_2$ takes the upper limit 42° of the condition (2), $\theta_1$ is 45.1°, and thus the performance of the PBS 6 is improved, but the limit of the half field of view $\theta_3$' in the medium is 4.2°. Further reducing the field of view would make the observation difficult and thus is not desirable.

From the above studies, when the angle $\theta_2$ satisfies a condition (3), the loss of light intensity can be further decreased.

$$35° < \theta_2 < 42° \quad (3)$$

That is, in this image display device, the direction of the line of sight in which the user's eye observes the virtual image of the display surface is intentionally inclined downward by 3° or more based on the condition (1). This has made it possible to satisfy the conditions (2), (3) under which the projection of an image with a wide field of view and a thickness reduction of the transparent substrate 1 are both enabled. That is, the securing of a wide field of view and a thickness reduction of the substrate are both achieved while the loss of light intensity is reduced.

Further, since the direction of the line of sight is inclined downward by 3° or more according to the condition (1), the direction of the line of sight in which the user sees an outside and that when the user sees the display surface deviate from each other to such a degree that the user can be conscious of the difference. Therefore, the user can freely switch a target between the outside and the display surface only by changing the line of sight.

Moreover, since the line of sight is changed in a "forward-downward" direction for switching the target here, the user does not get eye fatigue very much.

First Design Example of the Image Combiner of the First Embodiment

Next, a first design example of the image combiner of the first embodiment will be described.

Incidentally, in designing, code V (brand name) manufactured by Optical Research Associates in USA well known in this technical field have been used as a design program. Further, it is assumed that a color image-display element and a LED are used as the image-display element 2 and the light source 3 respectively (this applies also to design examples to be described later).

A view of optical paths of this design example is shown in FIG. 2.

Specifications of this design example are as follows:
diameter of the exit pupil P: 3 mm;
field of view in the Y direction: 0°~-9°;
field of view in the X direction: +6°~-6°;
size of the display surface in the Y direction: 3.6 mm;
size of the display surface in the X direction: 4.8 mm;
thickness d of the transparent substrate 1: 3.6 mm;
used wavelength: about 430 nm~about 640 nm;
refractive index nd of the transparent substrate 1 for a d-line (wavelength 587.56 nm): 1.583; and
Abbe number νd of the transparent substrate 1 for the d-line (wavelength 587.56 nm): 29.9.

Various values for ray tracing in this design example are shown in FIG. 18 and FIG. 19. In FIG. 18 and FIG. 19, the order of optical surfaces (order of the surface number) is the order from the exit pupil P to the image-display element 2 (the same applies to FIG. 20 to be described later). Further, the parenthesized reference symbols in FIG. 18 are reference symbols assigned to elements corresponding to the respective optical surfaces in FIG. 2.

The positions and postures of the optical surfaces in this design example are shown in FIG. 19. In FIG. 19, the positions are expressed by absolute positional coordinates and the postures are expressed by amounts of rotation around the X axis (anticlockwise rotation is defined as positive) when the origin of the XYZ Cartesian coordinate system is positioned at the center of a first surface (the surface number=1, the reference symbol P in FIG. 2).

Figure 4:
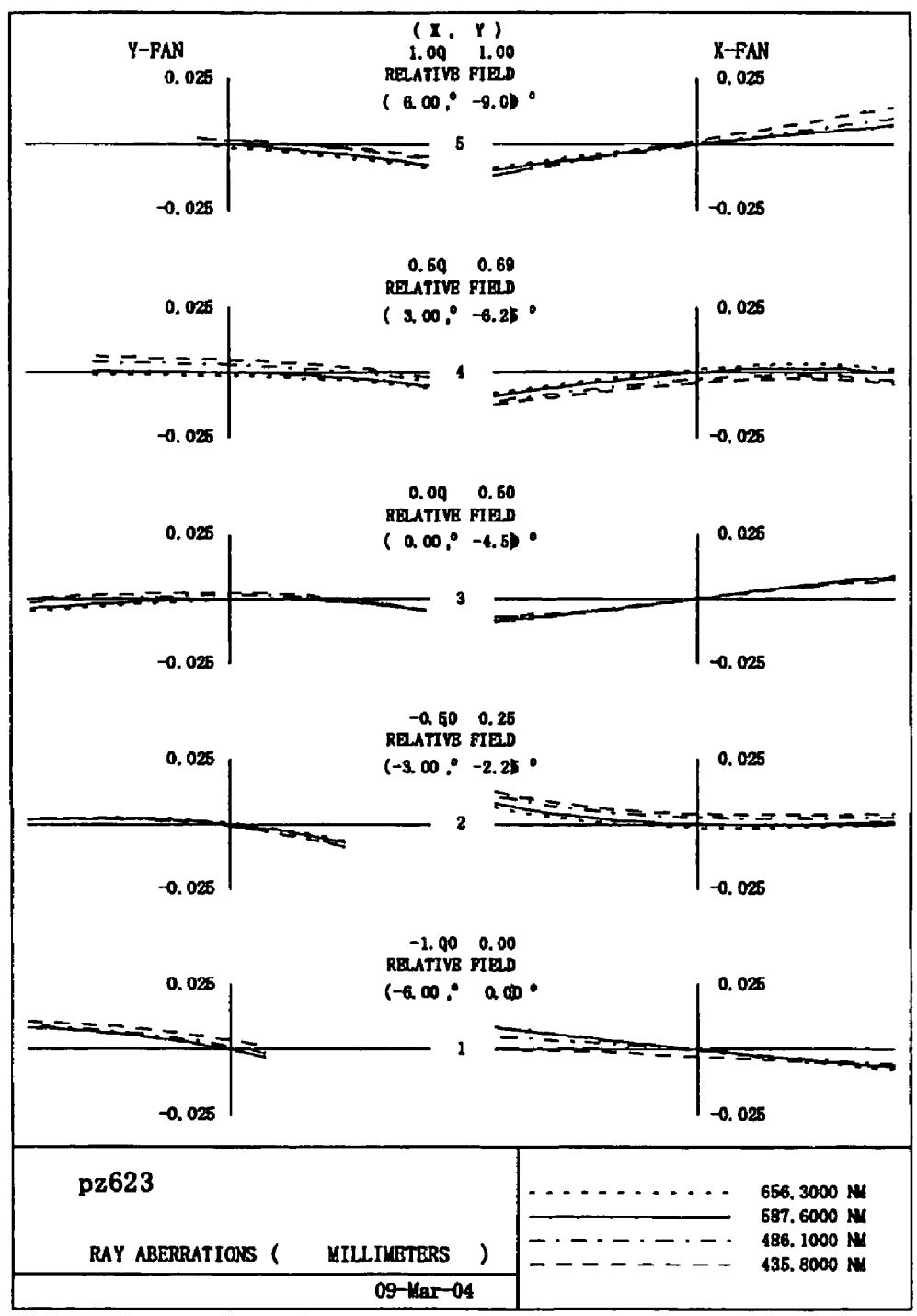
FIG. 4 is a view showing lateral aberrations of a first design example of the first embodiment.

A chart of lateral aberrations of the image combiner of this design example is shown in FIG. 4. In FIG. 4, X-FAN is lateral aberration in the X direction and Y-FAN is lateral aberration in the Y direction. FIG. 4 shows, in order from the top, the lateral aberrations at a field of view (X, Y)=(6.00°, -9.00°), the lateral aberration at a field of view (X, Y)=(3.00°, -6.25°), the lateral aberration at a field of view (X, Y)=(0.00°, -4.50°), the lateral aberration at a field of view (X, Y)= (-3.00°, -2.25°), and the lateral aberration at a field of view (X, Y)=(-6.00°, 0.00°).

Figure 5:
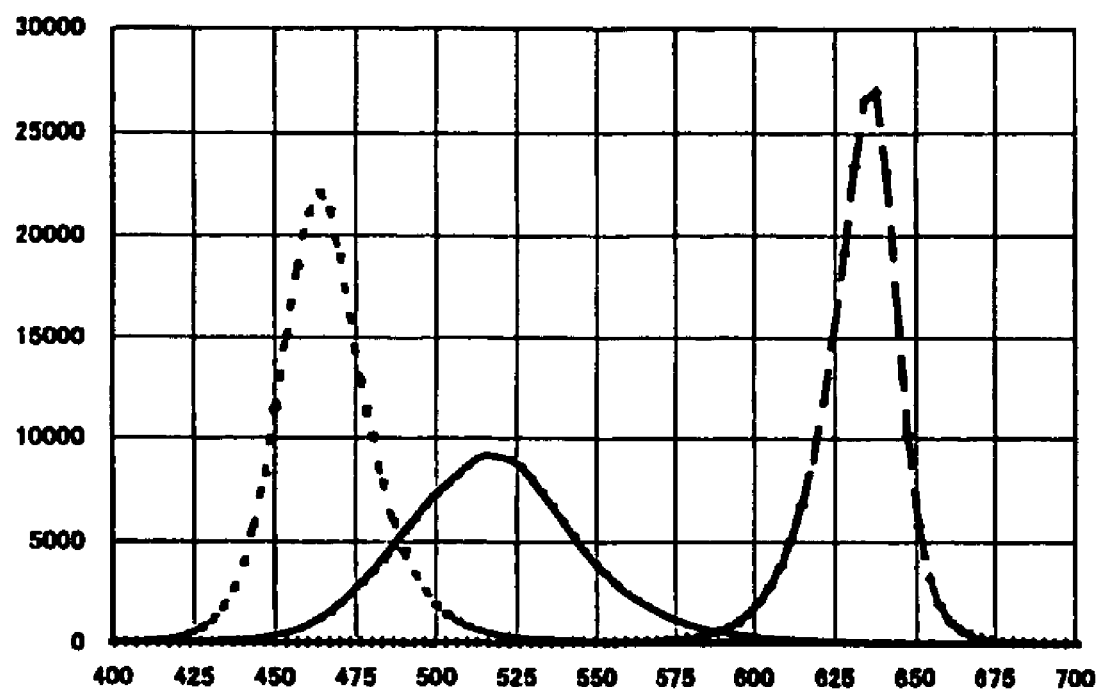
FIG. 5 is a graph showing emission wavelength characteristics of an LED.

Emission characteristics (wavelength-luminance characteristics: emission spectrum) of the LED of this design example are shown in FIG. 5. The horizontal axis shows wavelength and the vertical axis shows spectrum intensity.

As shown in FIG. 5, full widths at half maximum of the spectrum intensity in respective wavelength spectrums of this LED are as follows: Red: 23 nm, Green: 60.8 nm, and Blue: 29 nm.

Figure 6:
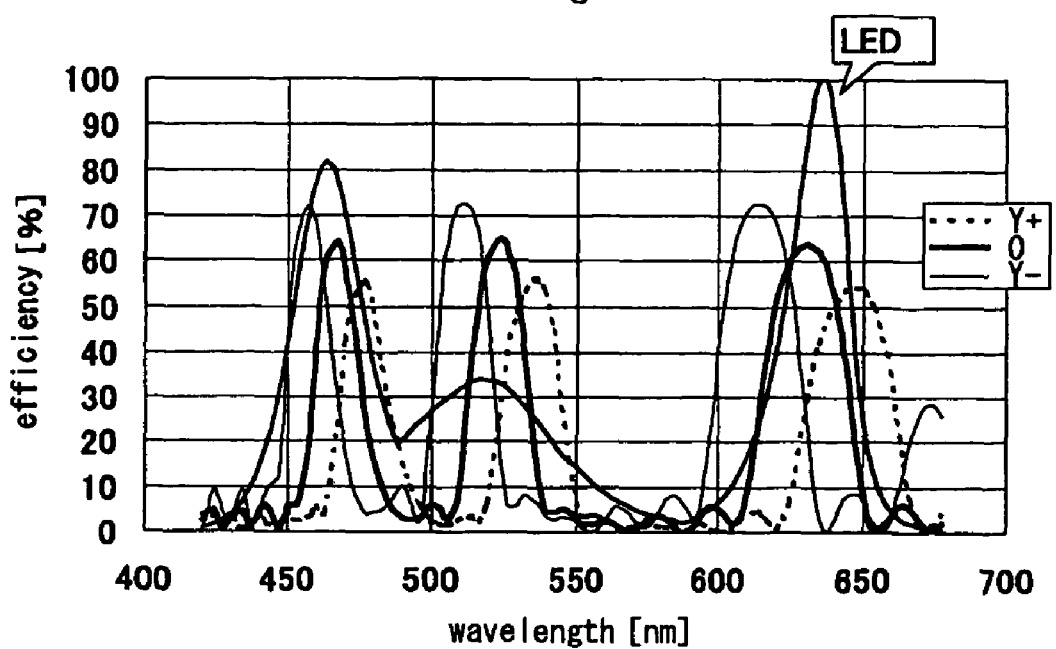
FIG. 6 is a graph showing wavelength characteristics of a PBS 6 of the first design example of the first embodiment.

Wavelength characteristics (wavelength-reflectance characteristics) of the PBS 6 of this design example are shown in FIG. 6.

In FIG. 6, the broken line is data on a light flux at the maximum field of view in the +Y direction, the bold line is data on a light flux at a center field of view, and the fine line is data on a light flux at the maximum field of view in the -Y direction. In FIG. 6, the vertical axis shows signal efficiency, which means efficiency of a light flux that passes through the PBS 6, passes twice through the λ/4 plate 7, and is reflected on the PBS 6. In FIG. 6, the emission spectrum of the LED is also depicted. Light intensity actually reaching the user's eye is a value equal to a product of these two kinds of graphs with geometric limb darkening further taken into consideration.

Figure 7:
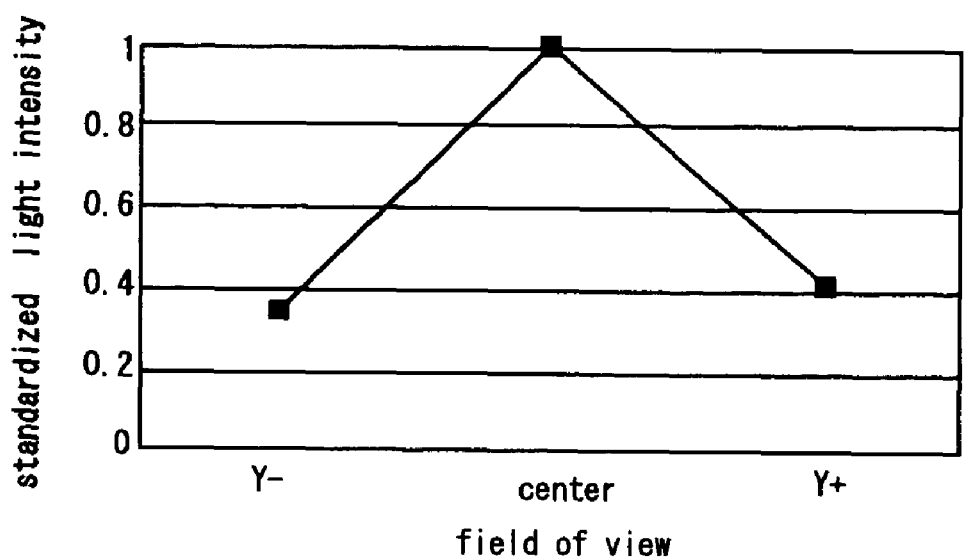
FIG. 7 is a graph showing intensity distribution of a display image observed in the first design example of the first embodiment.

For reference, intensity distribution of the display image (distribution of intensity of the virtual image of the display surface observed by the user) in this design example is shown in FIG. 7. In FIG. 7, the horizontal axis shows a field of view in the Y direction and the vertical axis shows standardized light intensity which is light intensity standardized based on the light intensity at the center field of view.

According to this design example, the angles of the respective portions of the image combiner are set as follows,
$\theta_0 = 4.5°$,
$\theta_1 = 42°$, and
$\theta_2 = 39°$ These $\theta_0$, $\theta_1$, and $\theta_2$ satisfy all the conditions (1), (2), (3).

Next, the effects of this design example will be described.

Imaging performance is excellent because chromatic aberration is small at all the fields of view as shown in FIG. 4. The loss of light intensity is sufficiently reduced as is apparent from the product of the two kinds of graphs shown in FIG. 6.

The field of view FOV is 15°, which is wide enough.

The thickness d of the transparent substrate 1 is 3.6 mm and thus is as thin as an eyeglass lens.

The angle $\theta_0$ of the line of sight when a user observes a virtual image of the display surface is 4.5°. The user can observe the outside by directing the line of sight to the front and can observe the virtual image of the display surface by inclining the line of sight downward only by 4.5°.

(Others)

This embodiment has described the image display device (see FIG. 1) in which the image-supply unit 1' is disposed on the user's forehead side, but it is also possible to similarly construct an image display device in which the image-supply unit 1' is disposed on the user's temporal side (ear side) as shown in FIG. 8(a).

In this case, the +Y direction and the +X direction of the XYZ Cartesian coordinates expressing the image display device are the leftward direction and the downward direction of the user respectively. In this case, as shown in FIG. 8(b), the direction of the line of sight in which the user's eye observes the virtual image of the display surface is an inward direction (the right direction if the user's eye is the left eye, and the left direction if the user's eye is the right eye). Therefore, the line of sight is changed in a "forward-inward" direction for switching the target. However, changing the line of sight in this direction may sometimes cause the user to get eye fatigue.

To prevent the fatigue, the image display device is structured so that the transparent substrate 1 is inclined relative to the user's face as shown in FIG. 9(a). In this case, the direction of the line of sight in which the user observes the virtual image of the display surface is a forward direction as shown in FIG. 9(b). Therefore, the user can observe both the outside and the virtual image of the display surface while keeping the line of sight directed to the front. Moreover, in this case, since the transparent substrate 1 is disposed along the curve of the face, the image display device can be fitted along the face like goggles.

Second Design Example of the Image Combiner of the First Embodiment

Next, a second design example of the image combiner of this embodiment will be described.

Its difference from the first design example lies in that the PBS 6 exhibits good wavelength characteristics for a wide wavelength range.

Figure 10:
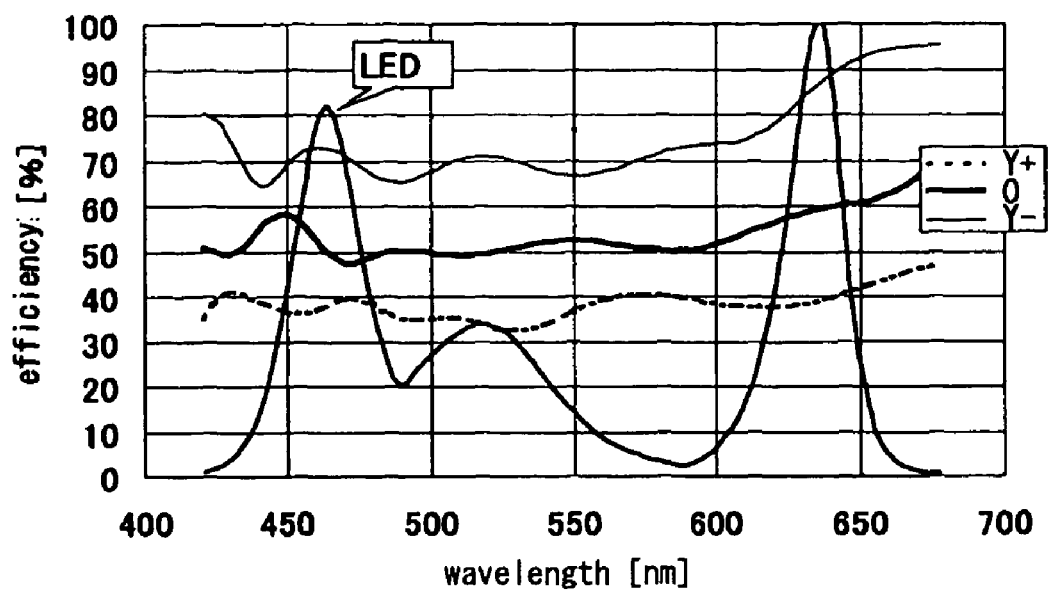
FIG. 10 is a graph showing wavelength characteristics of a PBS 6 of a second design example of the first embodiment.

The wavelength characteristics (wavelength-reflectance characteristics) of the PBS 6 of this design example are shown in FIG. 10. A notation method in FIG. 10 is the same as that in FIG. 6.

Figure 11:
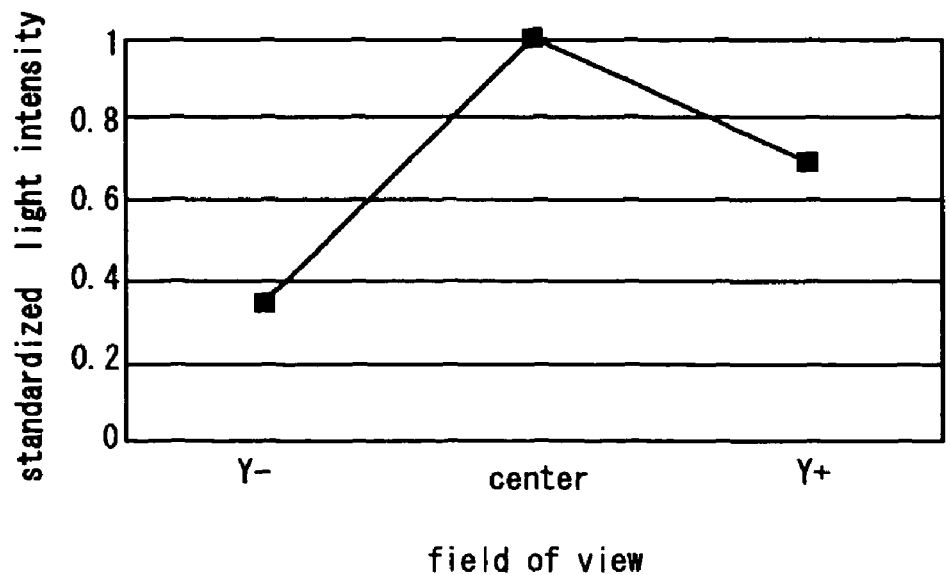
FIG. 11 is a graph showing intensity distribution of a display image observed in the second design example of the first embodiment.

Incidentally, according to this PBS 6 exhibiting the good wavelength characteristics for a wide wavelength range, intensity distribution of the display image (distribution of intensity of a virtual image of the display surface viewed by the user) become as shown in FIG. 11. A notation method in FIG. 11 is the same as that in FIG. 7.

This design example can also reduce loss of light intensity.

Second Embodiment

Hereinafter, a second embodiment of the present invention will be described based on FIG. 12, FIG. 13, FIG. 14, FIG. 15, FIG. 16, FIG. 17, FIG. 20, and FIG. 21.

This embodiment also concerns an image display device. Here, only what are different from the first embodiment will be described.

Figure 12:
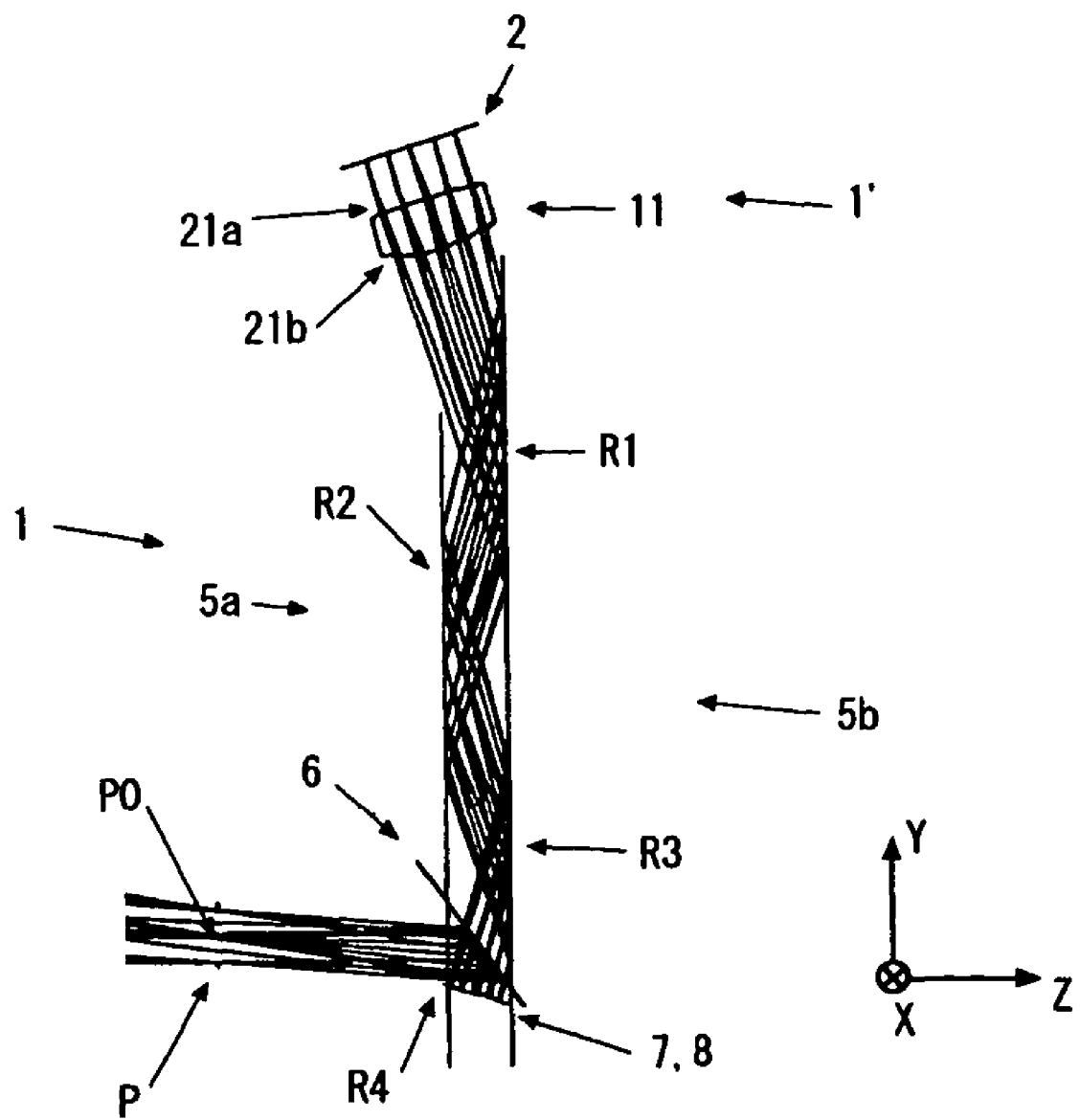
FIG. 12 is a view (cross-sectional view taken along the YZ plane) showing optical paths of an image display device of a second embodiment.

FIG. 12 is a view of optical paths of an image combiner of this image display device (view of optical paths from a display surface of an image-display element 2 to an exit pupil P). In FIG. 12, the same reference numerals and symbols are used to designate elements having the same functions as those shown in FIG. 2.

A major difference lies in the number of times light fluxes are inner-reflected in a transparent substrate 1.

The light fluxes emitted from the display surface of the image-display element 2 are reflected on a region R1 of a surface 5b, a region R2 of a surface 5a, and a region R3 of a surface 5b in the transparent substrate 1.

First Design Example of the Image Combiner of the Second Embodiment

Next, a first design example of the image combiner of this embodiment will be described.

Its major differences from the first design example and the second design example of the image combiner of the first embodiment lie in the number of times of the inner reflection and an angle $\theta_1$ (angle $\theta_1$ of optical axes on an incident side and a reflection side of a PBS 6 relative to a normal of the PBS 6).

Specifications of this design example are as follows:
diameter of an exit pupil P: 3 mm;
field of view in the Y direction: 0°~−10°;
field of view in the X direction: +6.67°~−6.67°;
size of the display surface in the Y direction: 3.6 mm;
size of the display surface in the X direction: 4.8 mm;
thickness d of the transparent substrate 1: 3.6 mm;
used wavelength: about 430 nm~about 640 nm;
refractive index nd of the transparent substrate 1 for a d-line (wavelength 587.56 nm): 1.583; and
Abbe number vd of the transparent substrate 1 for the d-line (wavelength 587.56 nm): 29.9.

Various values for ray tracing in this design example are shown in FIG. 20 and FIG. 21. Notation methods in FIG. 20 and FIG. 21 are the same as those in FIG. 18 and FIG. 19. Further, the parenthesized reference numerals and symbols in FIG. 20 and FIG. 21 are reference numerals and symbols assigned to elements corresponding to the respective optical surfaces in FIG. 12.

The positions and postures of the optical surfaces in this design example are shown in FIG. 21. In FIG. 21, the positions are expressed by absolute positional coordinates and the postures are expressed by amounts of rotation around the X axis (anticlockwise rotation is defined as positive) when the origin of the XYZ Cartesian coordinate system is positioned at the center of a first surface (the surface number=1, the reference symbol P in FIG. 12).

Figure 13:
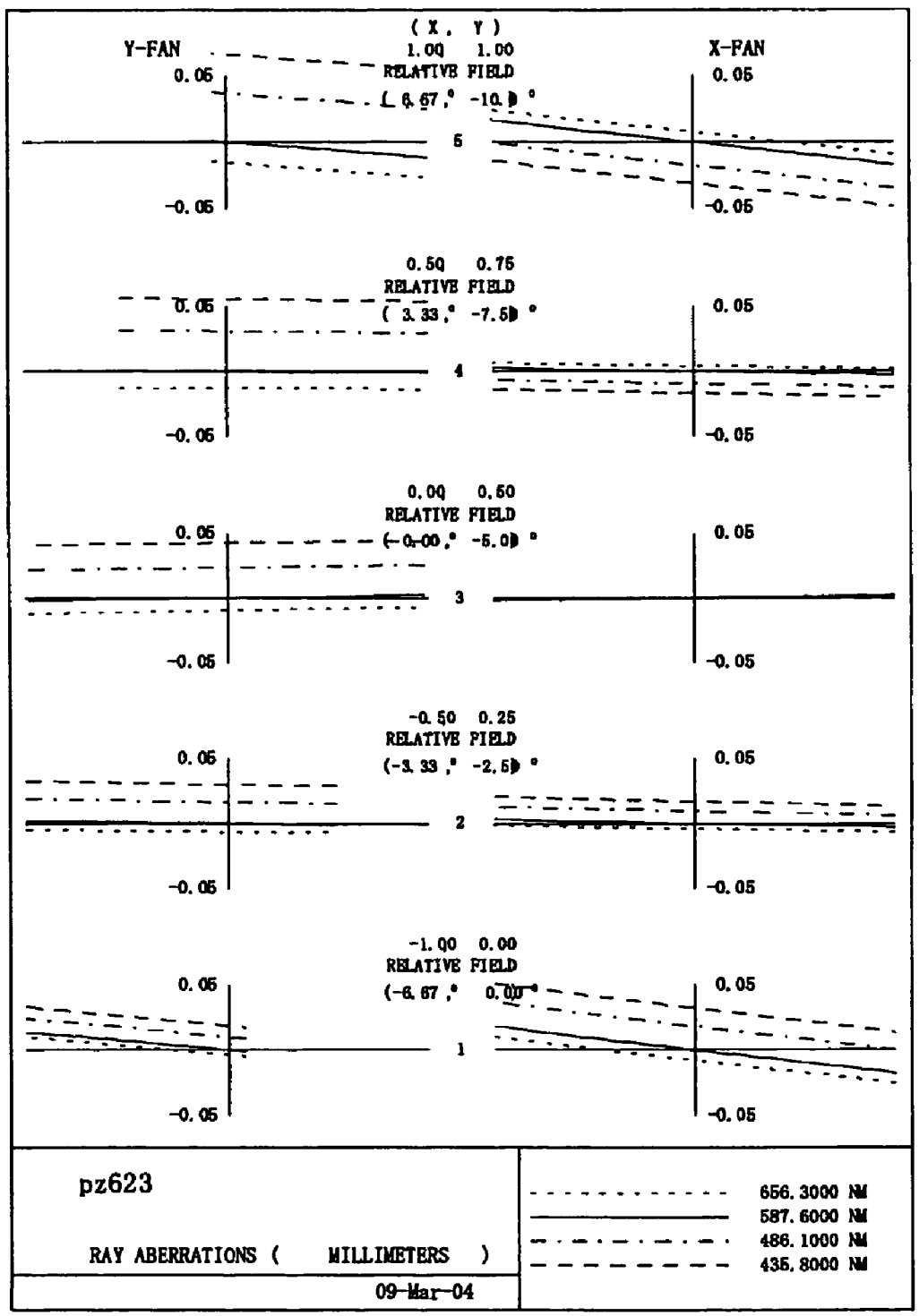
FIG. 13 is a chart showing lateral aberrations of a first design example of the second embodiment.

A chart of lateral aberrations of the image combiner of this design example is shown in FIG. 13. In FIG. 13, X-FAN is lateral aberration in the X direction and Y-FAN is lateral aberration in the Y direction. FIG. 13 shows, in order from the top, the lateral aberration at a field of view (X, Y)=(6.67°, −10.0°), the lateral aberration at a field of view (X,Y)=(3.33°, −7.5°), the lateral aberration at a field of view (X, Y)=(0.00°, −5.00°), the lateral aberration at a field of view (X, Y)=(−3.33°, −2.50°), and the lateral aberration at a field of view (X, Y)=(−6.67°, 0.00°).

Emission characteristics (wavelength-luminance characteristics: emission spectrum) of an LED of this design example are shown in FIG. 5.

Figure 14:
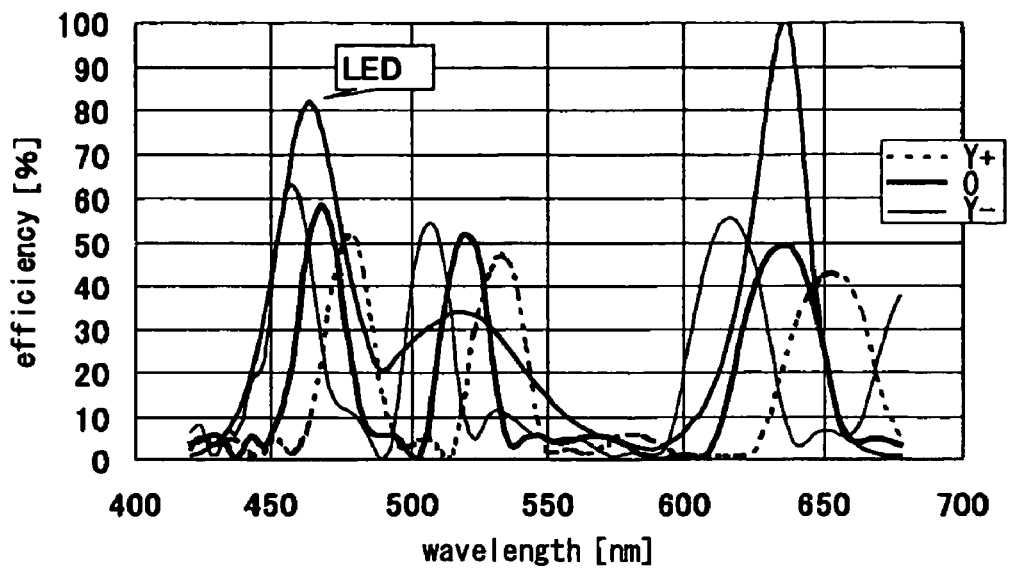
FIG. 14 is a graph showing wavelength characteristics of a PBS 6 of the first design example of the second embodiment.

Wavelength characteristics (wavelength-reflectance characteristics) of the PBS 6 of this design example are shown in FIG. 14. A notation method in FIG. 14 is the same as that in FIG. 6.

Figure 15:
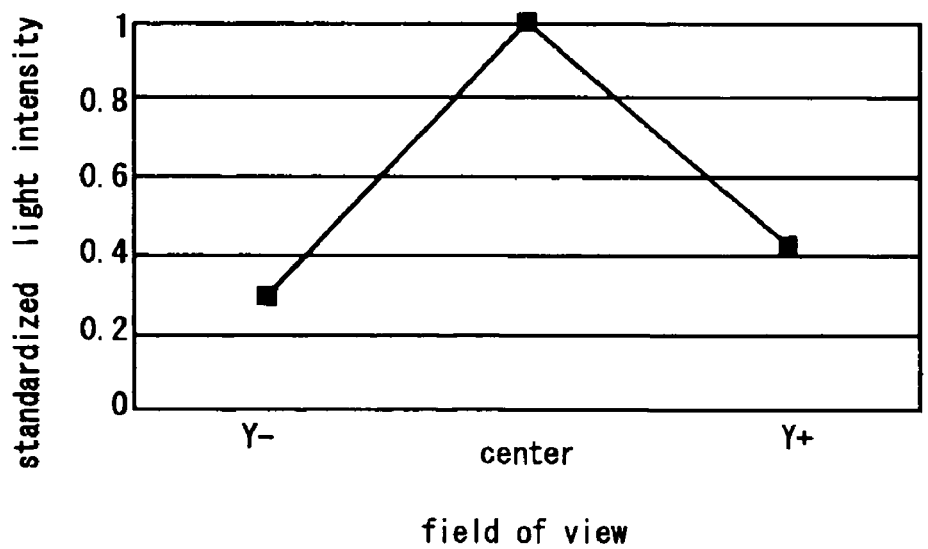
FIG. 15 is a graph showing intensity distribution of a display image observed in the first design example of the second embodiment.

For reference, intensity distribution of the display image observed in this design example is shown in FIG. 15. A notation method in FIG. 15 is the same as that in FIG. 7.

According to this design example, the angles of the respective portions of the image combiner are set as follows,
$\theta_0=5°$,
$\theta_1=38°$, and
$\theta_2=35°$.

These $\theta_0$, $\theta_1$, and $\theta_2$ satisfy all the conditions (1), (2), (3).

Next, the effects of this design example will be described.

Imaging performance is excellent because chromatic aberration is small at all the fields of view as shown in FIG. 13.

The loss of light intensity is sufficiently reduced as is apparent from the product of the two kinds of graphs shown in FIG. 14.

The field of view FOV is 15.6°, which is wide enough.

A thickness d of the transparent substrate 1 is 3.6 mm and thus is as thin as an eyeglass lens.

The angle $\theta_0$ of a line of sight when a user observes a virtual image of the display surface is 5°. The user can view an outside by directing the line of sight to the front and can view the virtual image of the display surface by inclining the line of sight downward only by 5°.

Second Design Example of the Image Combiner of the Second Embodiment

Next, a second design example of the image combiner of this embodiment will be described.

Its difference from the first design example lies in that the PBS 6 exhibits good wavelength characteristics for a wide wavelength range.

Figure 16:
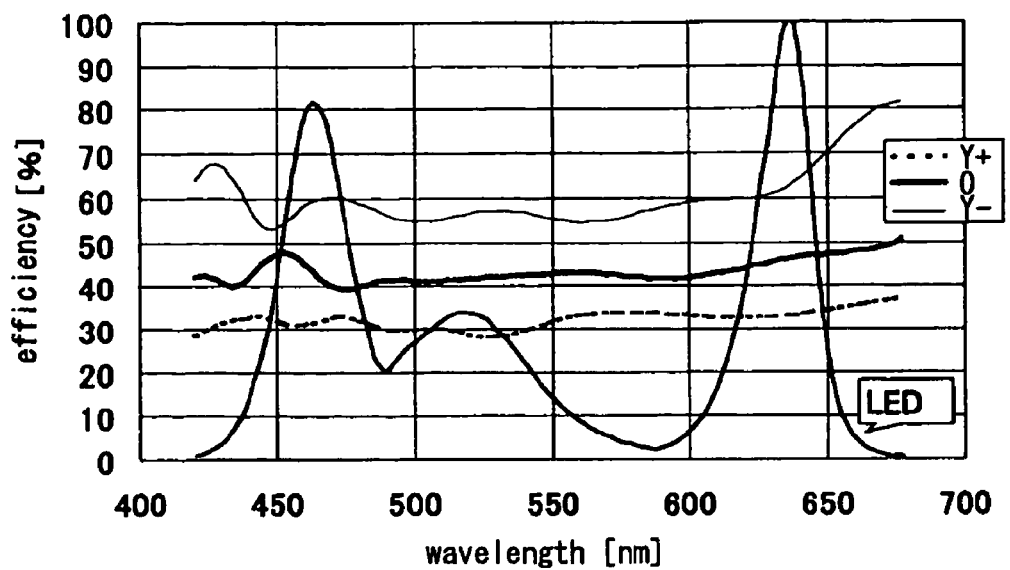
FIG. 16 is a graph showing wavelength characteristics of a PBS 6 of a second design example of the second embodiment.

Wavelength characteristics (wavelength-reflectance characteristics) of the PBS 6 of this design example are shown in FIG. 16. A notation method in FIG. 16 is the same as that in FIG. 6.

Figure 17:
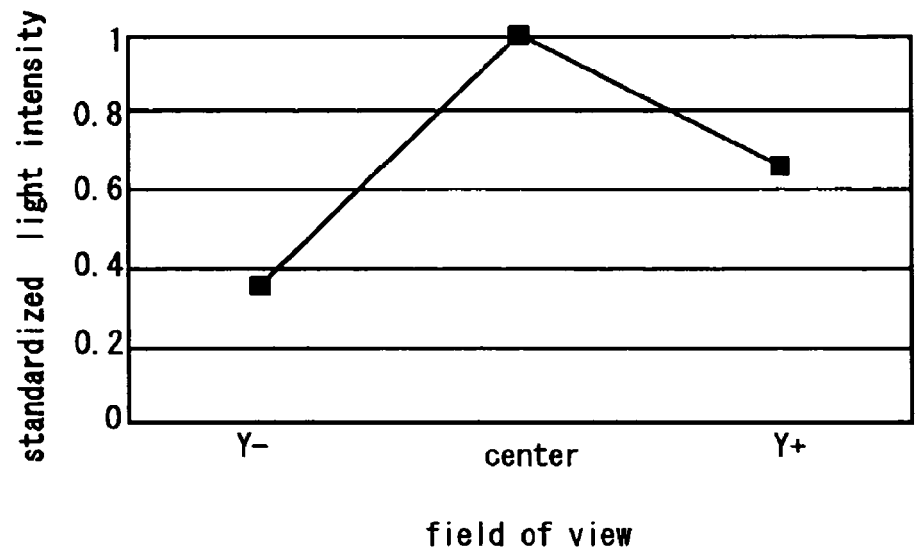
FIG. 17 is a graph showing intensity distribution of a display image observed in the second design example of the second embodiment.

For reference, intensity distribution of the display image observed in this design example is shown in FIG. 17. A notation method in FIG. 17 is the same as that in FIG. 7.

This design example as described above can also reduce the loss of light intensity.

(Others)

Figure 8:
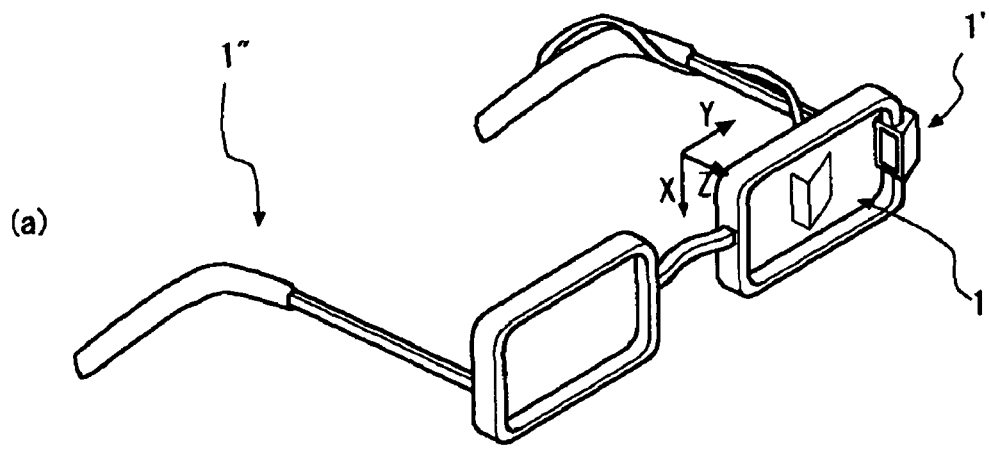
FIG. 8(a) is a perspective view showing the entire appearance of a modification example of the first embodiment.
FIG. 8(b) is a view (cross-sectional view taken along the YZ plane) showing the relation between a line of sight of a user's eye and a transparent substrate 1.
Figure 8:
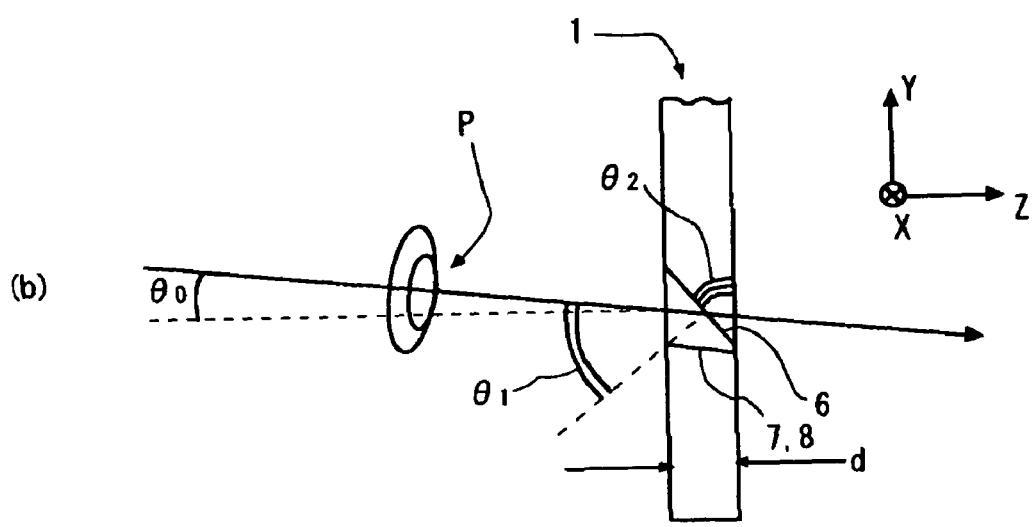
Figure 9:
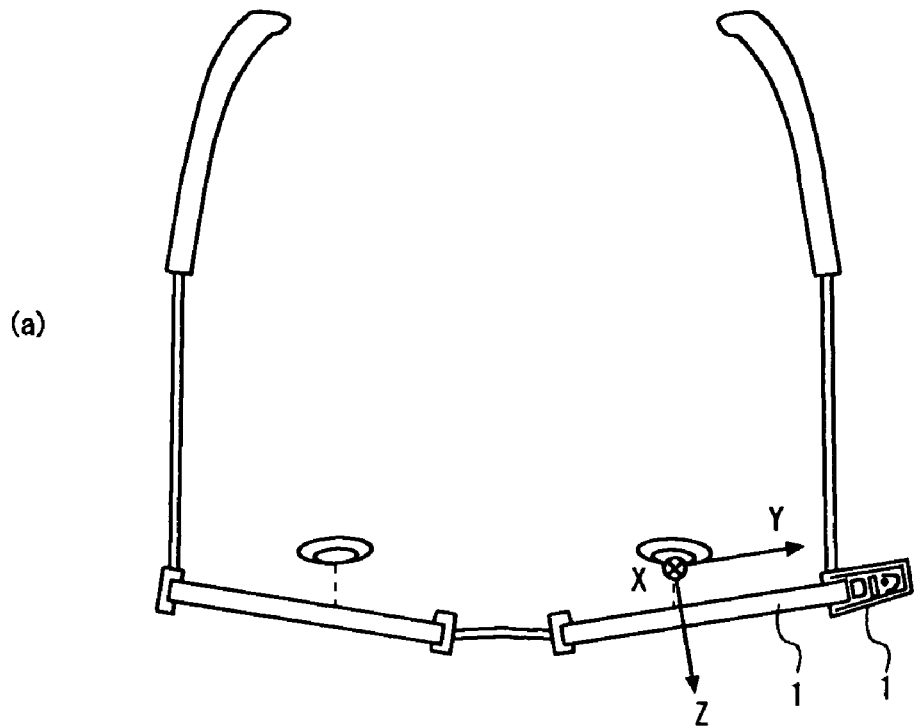
FIG. 9(a) is a cross-sectional view (cross-sectional view taken along the YZ plane) showing an entire appearance of another modification example of the first embodiment.
FIG. 9(b) is a view (cross-sectional view taken along the YZ plane) showing the relation between a line of sight of a user's eye and a transparent substrate 1.
Figure 9:
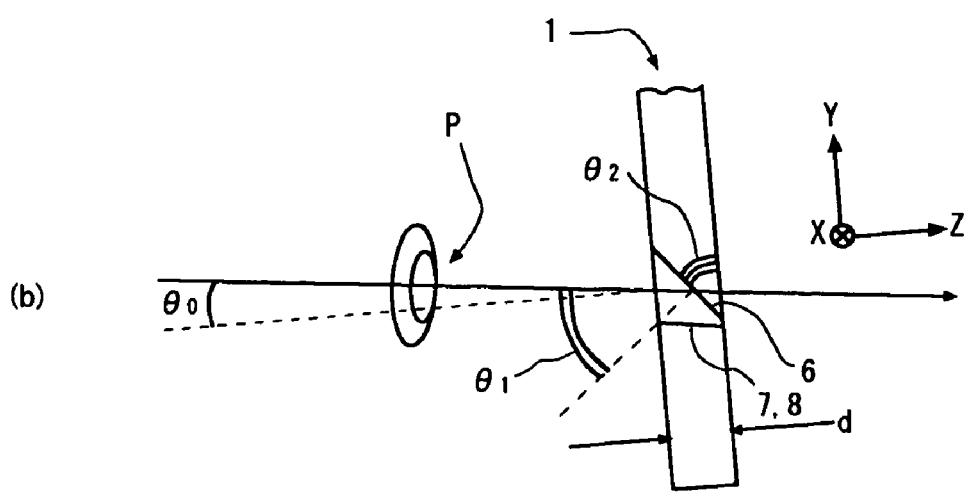

The image display device of this embodiment can also be modified as shown in FIG. 8 or FIG. 9.

Other Embodiments

In each of the above-described embodiments, the image-display element 2 is disposed at a position near the transparent substrate 1, but another possible structure is to dispose the image-display element 2 at a position apart from the transparent substrate 1 and project the display surface onto this position by a relay optical system. Further, an aerial image may be formed at this position by using a scanning optical system.

Further, the image display devices shown in FIG. 1 and FIG. 12 are image display devices for one eye each displaying an image only for one of the eyes of a user, but they may be modified to those for both eyes. In this case, it is also possible to display a stereo image as a displayed image.

Further, the support member 1" shown in FIG. 1 may be replaced by a support member with a different structure.

In each of the embodiments, in order to satisfy the condition under which the light fluxes are totally reflected when propagating in the transparent substrate 1 and to satisfy the aforesaid conditions of $\theta_0$, $\theta_2$ while securing the degree of design freedom, the concave mirror 8 is disposed on the incident side of the PBS 6, but any of other reflection members, for example, a mirror with a surface other than the concave surface or a diffraction optical element may be used instead of the concave mirror 8.

For example, a mirror with a surface other than a concave surface, a diffraction optical element, a reflective-type holographic optical element (HOE), or the like may be used. In particular, these reflection members having wavelength selectivity to select the wavelength of the light flux are not easily recognizable to a user or the like, which improves the appearance of the image display device. In addition, it is possible to prevent the reflection member from obstructing the view of a user. In particular, the reflective-type holographic optical element can easily have such a characteristic. By means of the reflective-type holographic optical element, reducing its optical power to substantially zero makes it possible to provide a good image having no chromatic aberration by use of a light source with various wavelengths.

The invention is not limited to the above embodiments and various modifications may be made without departing from the spirit and scope of the invention. Any improvement may be made in part or all of the components.

What is claimed is:

1. An image combiner comprising:
a lens element, including a convex lens and a concave lens, that guides a light flux from an image forming means;
a substrate disposed in front of a user's eye, the substrate being transparent to visible light, and introducing the light flux emitted from the lens element;
a reflection region inner-reflecting the light flux introduced from the image forming means into the substrate, the reflection region being a part of one surface of the substrate; and
a polarization beam splitter to which the light flux reflected at the reflection region enters twice and which makes the light flux entering for a second time incident on the user's eye outside the substrate, the polarization beam splitter being installed in the substrate, wherein
at least an angle $\theta_0$ between a line that is perpendicular to the reflection region and a principal ray of a portion flux of the light flux that directly enters the user's eye satisfies a condition of $3° \leq \theta_0$, the portion flux being a flux emitted from a center of a display surface of the image forming means; and
an inclination direction of the light flux heading into the user's eye relative to the line that is perpendicular is set so to make a display position of a virtual image of the display surface to be at a position in an obliquely downward direction from the user's eye.

2. The image combiner according to claim 1, wherein
an angle $\theta_2$ at which said polarization beam splitter is set relative to the reflection region satisfies a condition of $30° < \theta_2 < 42°$.

3. The image combiner according to claim 2, wherein
the angle $\theta_2$ satisfies a condition of $35° < \theta_2 < 42°$.

4. The image combiner according to claim 3, wherein:
the substrate includes a reflection member which reflects the light flux passed through the polarization beam splitter to make the light flux that is reflected become re-incident on the polarization beam splitter.

5. The image combiner according to claim 4, wherein
the reflection member is a concave mirror.

6. The image combiner according to claim 4, wherein
at least one of the reflection member and the polarization beam splitter have a reflection wavelength selectivity to select a wavelength of the light flux.

7. The image combiner according to claim 4, wherein
the reflection member is a reflective-type holographic optical element formed to have a concave surface.

8. The image combiner according to claim 7, wherein
the reflective-type holographic optical element has no optical power.

9. The image combiner according to claim 2, wherein:
the substrate includes a reflection member that reflects the light flux passed through the polarization beam splitter to make the light flux that is reflected become re-incident on the polarization beam splitter.

10. The image combiner according to claim 9, wherein
the reflection member is a concave mirror.

11. The image combiner according to claim 9, wherein
at least one of the reflection member and the polarization beam splitter has a reflection wavelength selectivity to select a wavelength of the light flux.

12. The image combiner according to claim 9, wherein
the reflection member is a reflective-type holographic optical element formed to have a concave surface.

13. The image combiner according to claim 12, wherein
the reflective-type holographic optical element has no optical power.

14. An image display device comprising:
the image combiner according to claim 1, and the image forming means emitting the light flux into the substrate.

* * * * *

UNITED STATES PATENT AND TRADEMARK OFFICE
CERTIFICATE OF CORRECTION

| | | |
|---|---|---|
| PATENT NO. | : 8,035,872 B2 | Page 1 of 1 |
| APPLICATION NO. | : 11/630621 | |
| DATED | : October 11, 2011 | |
| INVENTOR(S) | : Yumiko Ouchi | |

It is certified that error appears in the above-identified patent and that said Letters Patent is hereby corrected as shown below:

Title Page

Please add the following priority information to the front page of the patent:

Item --(30)    Foreign Application Priority Data
        Jun. 29, 2004 (JP) ........................ 2004-191840--

Signed and Sealed this
Thirty-first Day of January, 2012

David J. Kappos
*Director of the United States Patent and Trademark Office*